United States Patent [19]

Greenbaum

[11] Patent Number: 4,578,898

[45] Date of Patent: Apr. 1, 1986

[54] SOLAMAR WATER RECOVERY

[76] Inventor: George Greenbaum, 150 Huntington Ave., Boston, Mass. 02115

[21] Appl. No.: 580,066

[22] Filed: Feb. 14, 1984

[51] Int. Cl.⁴ .............................................. A01G 25/00
[52] U.S. Cl. ........................................ 47/79; 47/48.5; 47/81; 47/59
[58] Field of Search ...................... 47/79, 48.5, 81, 59; 202/234; 203/DIG. 17, DIG. 1

[56] References Cited

U.S. PATENT DOCUMENTS

| | | | |
|---|---|---|---|
| 4,141,798 | 2/1979 | Grosse | 203/DIG. 17 |
| 4,178,715 | 12/1979 | Greenbaum | 47/79 |
| 4,231,187 | 11/1980 | Greenbaum | 47/81 |
| 4,326,923 | 4/1982 | Mortenson | 202/234 |

FOREIGN PATENT DOCUMENTS 0042833 12/1975 Japan .......................... 203/DIG. 1

Primary Examiner—Robert A. Hafer
Assistant Examiner—Bradley M. Lewis
Attorney, Agent, or Firm—Thompson, Birch, Gauthier & Samuels

[57] ABSTRACT

A soil bed is spaced apart from a lagoon of saline water. The liquid vapor in equilibrium with the saline water permeates into the soilbed via diffuser tubes. At dusk the temperature of the soilbed decreases. The liquid vapor is entrapped in the soilbed and condenses. Additionally solar stills embodying flumes generate liquid vapor which is transported to the soilbed.

12 Claims, 9 Drawing Figures

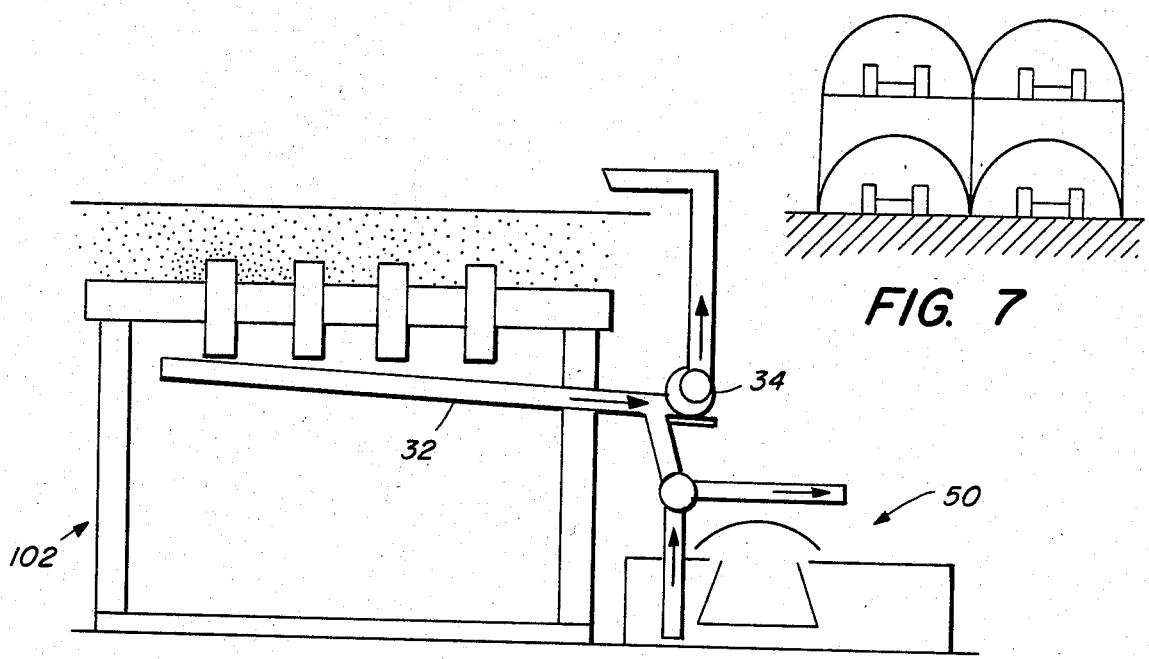
FIG. 7
FIG. 8
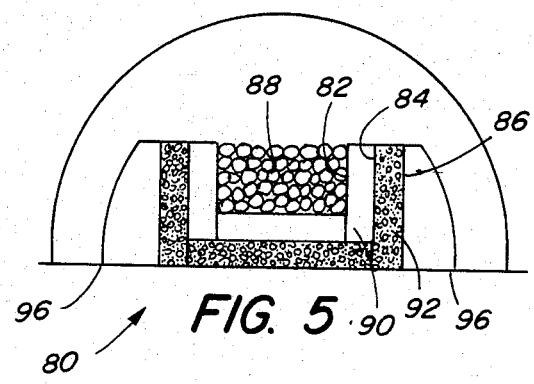
FIG. 5
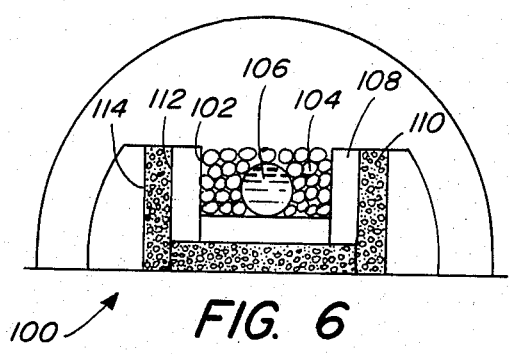
FIG. 6
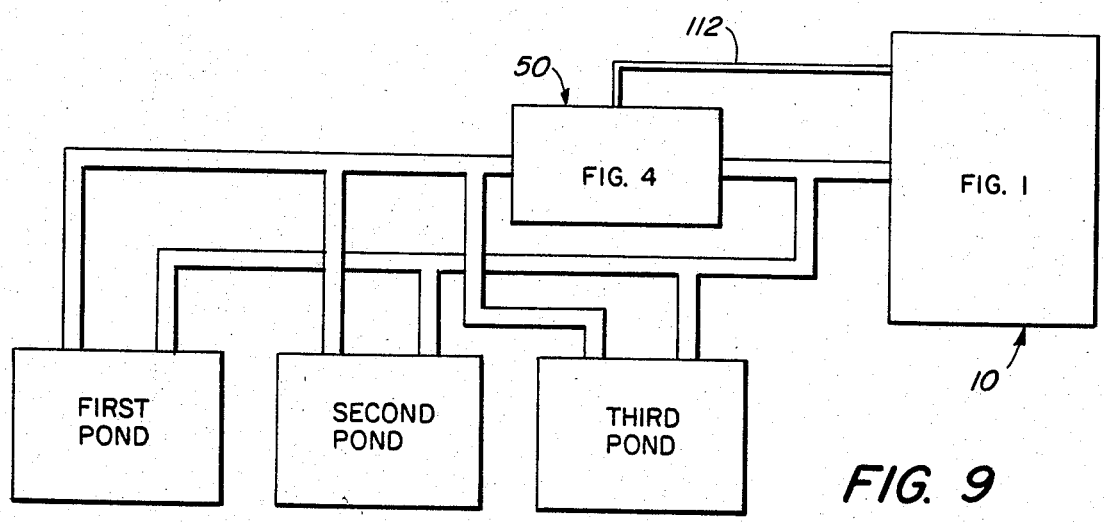
FIG. 9

SOLAMAR WATER RECOVERY

BACKGROUND AND BRIEF SUMMARY OF THE INVENTION

This invention relates to a system wherein water evaporated from salt water is used as a source of fresh water for either agriculture and/or aquaculture.

Successful wide scale agriculture in arid lands which are adjacent to unlimited supplies of sea water have always presented a perplexing problem, namely the inability to use sea water for plant growth.

Where sea water is used, it is typically desalinized such as by evaporation, osmosis or other separation techniques. This separation step adds considerably to the cost of the ultimate production of the crops.

A further drawback is one that has been discussed in my prior patents. When plants are placed in the soil, water and nutrients are not fully utilized because of the permeability of the soil. Thus if water sufficiently pure for crops is generated from sea water and used to irrigate crops in the ground, most of the water is wasted.

The aforementioned problems were overcome to a considerable degree by the invention disclosed in my prior U.S. Pat. No. 4,178,715. In that invention a plurality of channels were formed having a floor. The floor was spaced apart from a base and saline water flowed into a zone defined by the floor and the base. Temperature differences effected evaporation of pure water from the saline water. The evaporated water condensed and coalesced on the underside of the floor and permeated into the soil which the floor supported.

The present invention is directed to a system which is an improvement of the basic concepts disclosed in my aforementioned patent. Further, it is believed that the prior art is still best represented by the references cited in the aforementioned patent.

The present invention, relates to an apparatus and method for recovering a pure liquid vapor component from a contaminated liquid, which liquid the liquid vapor is in equilibrium with. This includes organic and inorganic wastes and aqueous wastes. More particularly the invention is directed to using water which would normally be considered contaminated for its intended use. More particularly, an apparatus and method are disclosed wherein the liquid vapor phase in equilibrium with the saline water is used to maintain the soil in which a plant is growing in a wetted condition without the saline water contacting the soil.

My invention comprises a structure and method to enhance the distribution of the liquid vapor and subsequent collection of the condensate. Additionally, the invention comprises controlling the levels of salinity of the water where it can range anywhere from brackish water to potable water and additionally the recovered water may be used for aquaculture as well as agriculture.

My invention includes flowing relatively contaminated water at a first higher temperature $T_1$ into a zone which zone is at a second lower temperature $T_2$, the liquid vapor in equilibrium with the water at temperature $T_2$ being non-contaminated; flowing the liquid vapor from the zone into a soil bed, maintaining the liquid vapor in the soil bed and subsequently condensing the liquid vapor.

The basis for the use of the normally polluted water, such as sea water, for purposes of my invention, is that in tropical areas the typical ambient temperature during the day may range from 120° to 130° F., and the surface temperature of the water from 140° to 160° F. As is well understood there always exists a relationship among temperature, both dry and wet bulb, dew point, moisture content per pound of dry air, etc. If a given volume of air is cooled, its ability to hold moisture is diminished and condensation of the moisture from the air results if the temperature reduction of the air occurs within a defined space or on an exposed surface. These relationships can be determined from any psychrometric chart.

In my invention water and the air in which it is in equilibrium with is caused to pass and circulate under the floor of a soilbed. In the preferred embodiment of my invention diffuser tubes extend from a zone, defined by the upper surface of the water and the under surface of a soilbed, and into the soilbed. The sea water with the liquid vapor in equilibrium therewith, flows under and is in communication with the soilbed via the diffuser tubes during the day. The diffuser tubes allow the air containing the liquid vapor to permeate the entire soilbed. At the top surface of the soilbed the liquid vapor will essentially evaporate into the ambient. At the interface between the diffuser tubes and the soilbed and the floor of the soilbed, the liquid vapor content will essentially be the same as the liquid vapor content in equilibrium with the sea water in the zone. To maximize the amount of liquid vapor in the soilbed, i.e. prevent surface evaporation different colors of granules and sizes may be used to minimize the surface temperature.

Typically, in desert-like regions, the ambient temperature during the day may be 120°–130° F., and, as is well known, within a short period of time, i.e. an hour or so, the temperature may drop to 40°–60° F. at night. In that the sandbed becomes impregnated with the air carrying liquid vapor over a long period of time during the day, when the sudden drop in temperature occurs, the liquid vapor does not escape into ambient air. Rather the liquid vapor is entrapped by the soilbed (including surfaces of the floor, walls and diffusor tubes). The particles of the soilbed and inner walls form contact or heat exchange surfaces. When the temperature drops rapidly the liquid vapor condenses, thereby saturating the soilbed.

BRIEF DESCRIPTION OF THE DRAWINGS

FIG. 5 is a front view of an alternative embodiment of a solar still;

FIG. 6 is a front view of a solar still employing an indirect heat exchange medium.

FIG. 7 is a front schematic of a plurality of stills in combination;

FIG. 8 is a front schematic of the system of FIG. 1 in combination with the solar still of FIG. 4; and FIG. 9 is a plan view of my system in combination with solar ponds.

DESCRIPTION OF THE PREFERRED EMBODIMENTS

The preferred embodiment will be described in reference to contaminated water, specifically sea water. As is well known, the moisture in the vapor phase is pure in the sense that the salts and other deleterious impurities remain in the liquid phase. Thus when the liquid phase condenses, it is pure and suitable for plant growth or for discharge to another system. In accordance with the principles of my invention, other sources of contaminated or polluted water may be used where the impurities of the liquid phase are not found in the liquid vapor in an amount sufficient to prevent plant growth.

Figure 1:
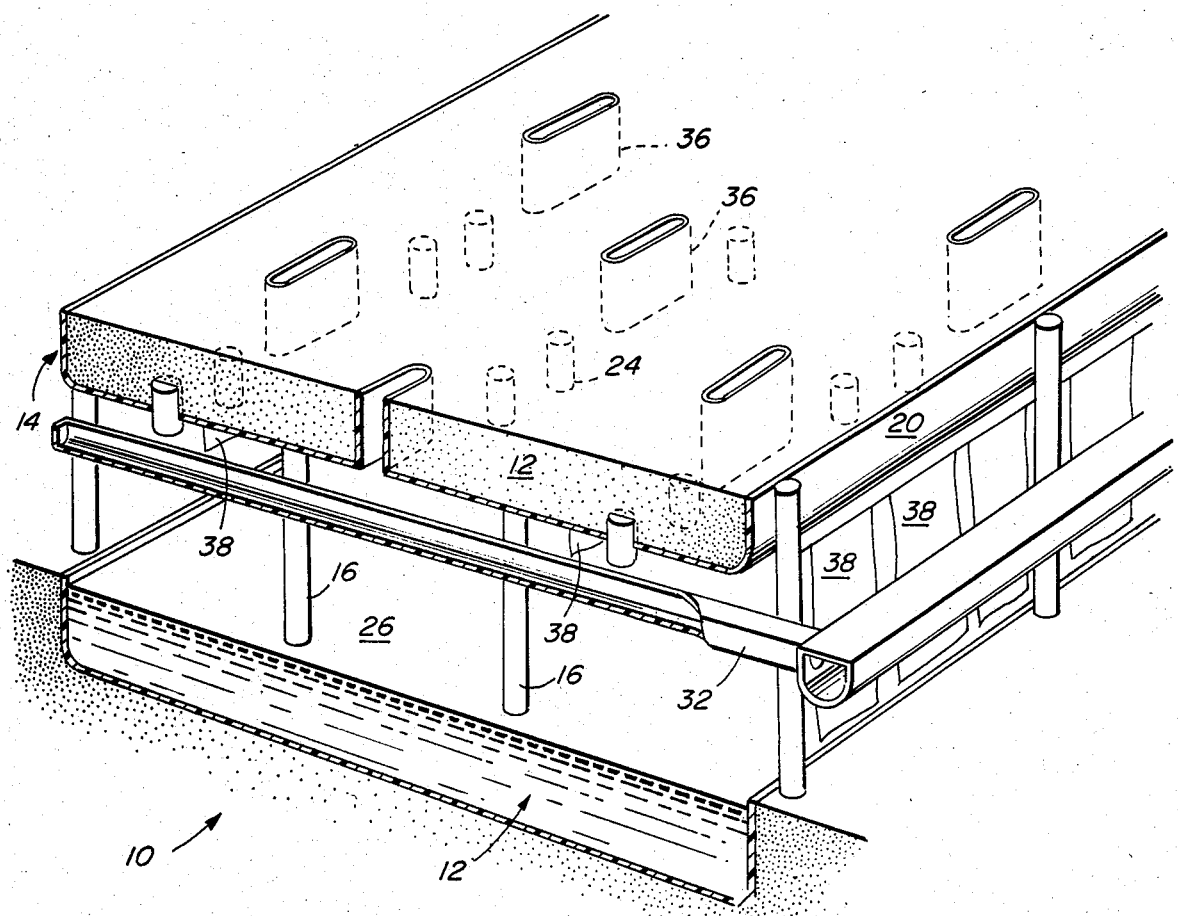
FIG. 1 is a partially perspective view of a system embodying the invention.
Figure 3:
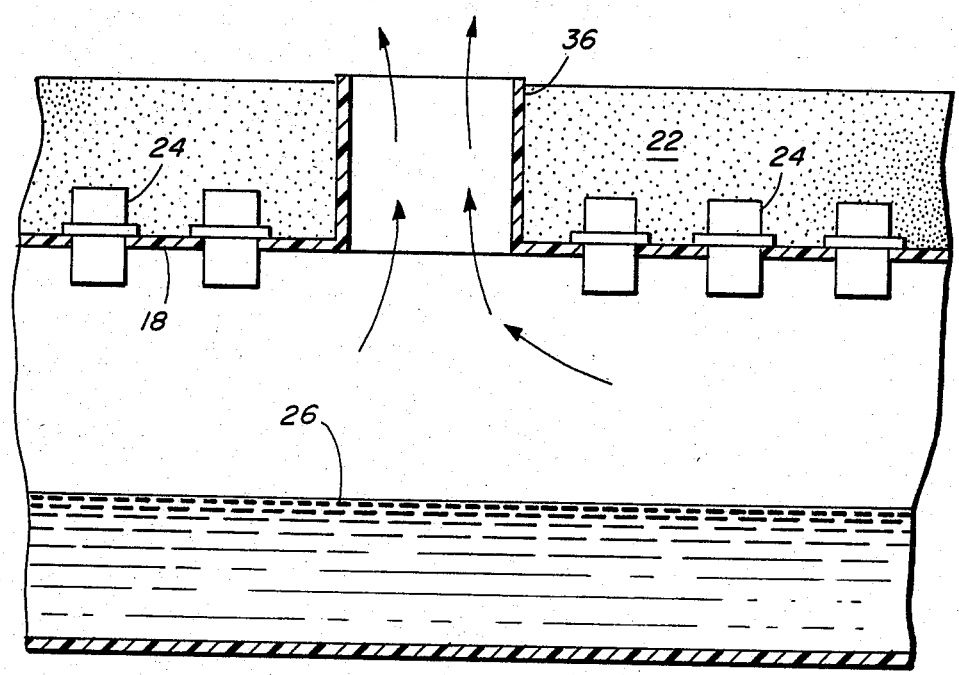
FIG. 3 is a schematic view of FIG. 1.

Referring to FIGS. 1 and 3 the basic system 10 is shown and comprises a lagoon 12 through which sea water may be circulated. A plant support bed 14 is spaced apart from the lagoon 12 by piles 16. The lagoon may be natural or man made, such as from thick polyethylene lining material.

The bed 14 comprises a floor 18, wall 20 and plant support material 22 such as sand disposed in the bed 14. To provide for full permeation of the liquid vapor into the bed, a plurality of diffuser tubes 24 are received in the floor 18. The tubes extend into the sand 22 and into a zone 26 defined by the underside of the floor 18 and the upper surface of the water in the lagoon 12.

Figure 2:
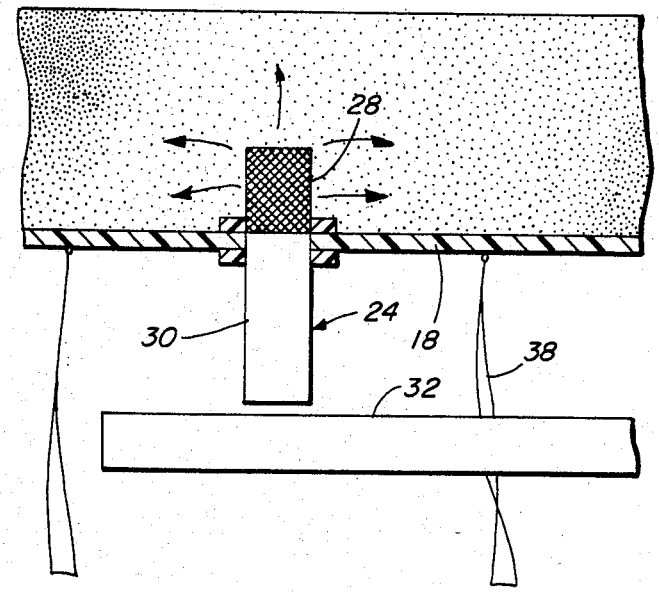
FIG. 2 is a front schematic of a diffuser tube gutter arrangement.

The diffuser tubes 24 provide for the transport of the liquid vapor, upwardly through the tube whereby the liquid vapor diffuses into the plant support material as shown by the arrows in FIG. 2.

Referring to FIG. 2, a diffuser tube 24 is shown in greater detail and comprises an upper sleeve 28 and a lower sleeve 30. The upper sleeve is formed of open mesh material. The liquid vapor moving through the tube will contact all exposed surfaces. Where the liquid vapor contacts the lower sleeve 30, it will condense on the surface, coalesce and flow downwardly into a gutter 32 where it is collected and recycled by a pump 34, see FIG. 7 to form a recycle stream of water as shown in FIG. 7. This recycle stream may be introduced into the plant support bed 14 in any desired manner; or it may be used for other purposes as desired. When the liquid vapor contacts the open mesh upper sleeve 28 it diffuses therethrough and permeates into the sand 22.

Referring to FIG. 1, the diffuser tubes are shown in a uniform array which enhances the use of the gutters 32 (only one shown). The diffuser tubes may be disposed in any array, uniform or non-uniform; and at any depth into the bed 14.

Formed in the bed 14 are a plurality of chimneys 36. The primary purpose of the chimneys is to aid in the movement of air within and through the zone 26 to enhance the overall circulation and movement of the air into and from the zone to thereby maximize the contact of the hot liquid vapor (moisture laden air) with the diffuser tubes. Additionally, screens or curtains 38 extend downwardly from the floor any desired distance for any extent along the perimeter of the system to function as baffles to enhance the movement of the air within the zone and its contact with the diffuser tubes.

Figure 4:
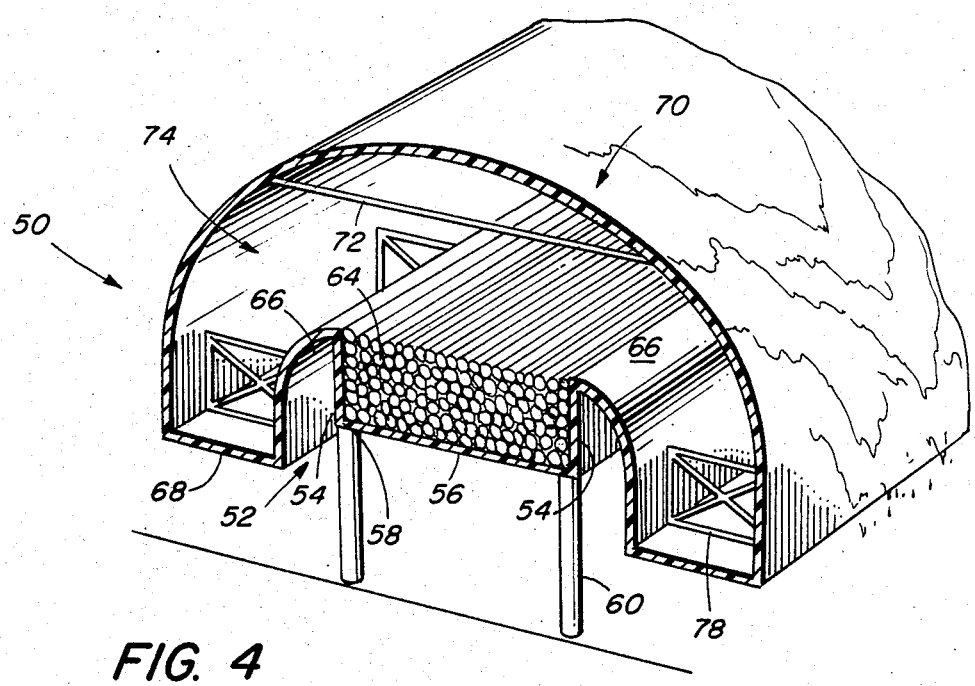
FIG. 4 is a perspective view of a solar still.

Referring to FIG. 4 there is illustrated a solar still 50 comprising a flume 52 having sides 54 joined to a floor 56 at fold lines 58. The floor 56 is supported on piles 60 although the floor may lie on the ground. The inner portion of the flume 52 is filled with a packing material, preferably black polyethylene perforated strips 64 to maximize the water-to-heated black surface contact area. Any suitable packing could be used such as rings, saddles, etc. commonly employed in mass transfer operations based on the usual energy and material balances. Extending outwardly and downwardly from the upper edges of the sides 54 are wings 66 made of polyethylene black lining material, which wings 66 extend downwardly and are joined to one edge of a floor 68. Superimposed over the flume 52 is a canopy 70 which extends downwardly and at its lower edge it is joined to the other edge of the floor 68 defining a dead-air zone 74 therebetween. The canopy includes a flat baffle member 72 secured thereto. Basically the packed still is configured both as to structure and in regard to its physical properties, relative to the absorption of infrared rays to maximize the use of solar energy.

In the use of the solar still sea water flows into the flume 52 of the still 50 where it is heated by absorption of solar energy. The solar still functions in a similar manner as the system 10 previously described; namely, hot sea water with liquid vapor in equilibrium therewith flows into the still. The absorptive qualities of the black lining material, used for the materials of construction and the packing material, increases the amount of thermal energy or temperature within the still. At nightfall, the sharp drop in temperature results in the liquid vapor in the gaseous phase condensing and flowing onto the floor 68 between the wing 66 and depending wall of the canopy 70 which define a dead air zone 74. Supports 78 provide structural stability to the still 50. Further, the amount of heat absorbed by the packing material during the day dissipates slowly such that at nightfall liquid vapor will continue to form and subsequently condense for a considerable time after nightfall. That is, the dual wall-dead air zone concept of the solar still used in combination provides an insulated region which together with the packing in the flume retains the heat substantially beyond the time that the ambient external to the outer canopy has cooled down thus continually generating, albeit at a diminishing rate, a source of heat to continue evaporation of pure water.

As shown in FIG. 4 water flows over the outer surface of the canopy 70 to aid in the condensation of the liquid vapor.

The basic solar still concept embodied in FIG. 4 may be expanded to include additional dead air zones.

Referring to FIG. 5, a solar still 80 is shown comprising a first square-shaped flume 82 received within and spaced apart from a second square-shaped flume 84. The second flume 84 in turn is received within and spaced apart from a third square-shaped flume 86. The flume 82 is filled with packing material 88 such as that described for the flume 50. The walls of the flume 82 define with the walls of the flume 84 a zone 90. Similarly, the walls of the flume 84 define with the walls of the flume 86 a zone 92. A canopy 94 embraces the flumes; the depending walls of the canopy defining with the outer walls of the flume 86 a trough 84 having a floor 96, for the collection of condensate.

The zones 90 and 92 are enclosed to define insulated barriers or dead air zones as shown in FIG. 5. Either one or both zones 90 and 92 may be filled with packing material to retain the thermal energy acquired during the day. Alternatively, heated sea water from a lagoon could flow into one or both zones and during the day acquire thermal energy and slowly release its thermal energy commencing at dawn. Molten salt may be held in one or both of the dead air zones. This salt (an eutectic mixture) would absorb energy during the day and at night it would slowly release its thermal energy. The zones 90 and 92 are primarily designed to insulate and enhance the efficiency of the flume 82. That is the additional insulating layers or zones are provided to effectively maximize the continued condensation of liquid vapor.

Referring to FIG. 6, a solar still 100 substantially as shown in FIG. 5, comprises an inner flume 102, as previously described contains packing 104 which the heated water will contact. A conduit 106 is disposed within the packing, preferably centrally, for the flow of a heat exchange fluid therethrough. This heat exchange fluid such as ethylene glycols is heated externally such as in a separate storage area, whether it be a lagoon, tank or the like, and is pumped through the conduit 106 and recycled to its storage area. The conduit places the heated fluid which may assume a temperature of between about 250° to 400° Farenheit in indirect heat exchange contact with the packing and water within the flume 102. An especially suitable heat exchange fluid is the bottom dense layer of salt water of a solar energy pond. These multi layer ponds are well known and are used as an energy source for turbines. The lowermost layers will reach temperatures of over 200° F. The specific configuration of the conduit 104 will vary depending upon the $\Delta F$ to be achieved between the heat exchange fluid and the sea water. The conduit may be fluted, finned, etc. as is well known in the heat exchange art. Alternatively, no packing need be used in the flume 102.

When the heated water from a solar energy pond is used the conduit may be perforated such that at least a portion, if not all of the heat-exchange fluid may mix with the water flowing through the flume. This will aid in the evaporation of the water. With enough salt in the solar energy pond the lowermost layer conceivably could reach about 225° F.

In a manner similar to the structure disclosed in FIG. 5 additinal dead air zones 108, 110 are defined by flumes 112 and 114 respectively. Either alone or in combination these zones provide the insulating function for which they are designed and may contain hot saline water, air, solar heated heat-exchange fluid such as described for the conduit 104 and/or a packing material which is particularly susceptible to absorbing solar radiation or combinations thereof.

The stills 50, 80 or 100 may be used in combination with similar stills as illustrated in FIG. 7.

Referring to FIG. 8 the still 50 is external to the system 10 shown in FIGS. 1 and 3. The operation of the still 50 may be either a continuous or batch operation.

For the lagoon of FIGS. 1 and 3 and the flumes of FIGS. 4, 5 and 6 the source of water is preferably from preheated solar storage ponds. The ponds are allowed to increase their thermal energy from the suns rays.

Referring to FIG. 9, the heated water from a first pond discharges, at a fixed rate its water into the flume 52 and is held therein assuming a batch operation and the heated water flows continuously to the lagoon 12 of the system 10. Water is held in the second pond for solar heating while the third pond is being filled. Subsequently the second pond discharges to the flume 52 and lagoon, the first pond is filled while the third pond is heated, etc.

Condensate removed from the flume 50 is transferred by line 112 which communicates with the gutter 32. Alternatively the heated sea water from the flume 50 may pass into the lagoon 12.

Having described my invention what I now claim is:
1. A method for irrigating a soil bed which includes:
flowing contaminated water into a zone;
passing the liquid vapor in equilibrium with said water through a plurality of diffusion members, whereby the liquid vapor permeates throughout the soil bed;
flowing the water through a flume have packing material therein;
exposing the flume to infrared radiation;
condensing the liquid vapor in equilibrium with the water in the flume;
transferring said condensate to the soil bed; and
entrapping the liquid vapor in the soil bed whereby when the temperature drops the liquid vapor is prevented from diffusing into ambient and coalesces as liquid on the contact surfaces in the soil bed.

2. A system for utilization of sea water for plant growth which comprises:
a soil bed having a floor and walls and adapted to contain plant support material;
means to flow contaminated water under the floor of the soil bed;
means to maintain the undersurface of the floor spaced apart from the upper surface of the contaminated water which flows under said floor, the upper surface of the floor and the upper surface of the water defining a zone therebetween;
a plurality of diffusion members passing through the floor and extending into the soil bed and extending into the zone, the diffusion members adapted to pass a liquid vapor in equilibrium with the contaminated water from the zone and into the soil bed whereby the liquid vapor condenses in the soil bed;
a flume spaced apart from the soil bed the flume having outer walls and packing material disposed therein and wing members extending downwardly from the wall;
a canopy extending over the flume and downwardly, the depending ends of the canopy forming with the depending ends of the wings a trough to receive condensate formed from the liquid vapor in equilibrium with the contaminated water flowing through the flume; and
means to transport the condensate to the soil bed.

3. The system of claim 2 wherein the diffusion members are tubes.

4. The system of claim 2 wherein the tubes extend through the floor of the soil support system.

5. The method of claim 2 which includes means to collect condensate from the underside of the floor.

6. The system of claim 2 wherein the flume is a first flume and which comprises;
a second flume having outer walls the outer walls of the second flume spaced apart from the outer walls of the first flume to define a dead-air space therebetween.

7. The system of claim 6 which includes a third flume having outer walls the outer walls of the third flume spaced apart from the outer walls of the second flume to define a dead-air space therebetween.

8. The system of claim 7 which includes packing material disposed in one of the dead-air spaces.

9. The system of claim 8 wherein the packing material comprises a eutectic salt.

10. The system of claim 2 which comprises means to flow a heat exchange fluid through the packing of the first flume.

11. The system of claim 9 wherein the means to flow a heat-exchange fluid through the packing includes a conduit having an opening thereon whereby the heat-exchange fluid may mix with the water flowing through the flume.

12. The system of claim 2 which comprises a plurality of chimneys passing through the soil bed to enhance the movement of liquid vapor into the diffusion members.

* * * * *